United States Patent [19]
Fuchs, Jr.

[11] 3,731,509
[45] May 8, 1973

[54] CONTINUOUS MATERIAL FEEDING AND DEFORMATION PROCESS

[75] Inventor: Francis J. Fuchs, Jr., Princeton Junction, N.J.

[73] Assignee: Western Electric Company, Incorporated, New York, N.Y.

[22] Filed: Oct. 4, 1971

[21] Appl. No.: 186,368

Related U.S. Application Data

[60] Division of Ser. No. 876,940, Nov. 14, 1969, Pat. No. 3,667,267, which is a continuation-in-part of Ser. No. 794,488, Jan. 28, 1969.

[52] U.S. Cl. ........................................72/60, 72/271
[51] Int. Cl. ...........................................B21c 31/00
[58] Field of Search..............................72/60, 271

[56] References Cited

UNITED STATES PATENTS

3,526,115  9/1970  Armstrong et al........................72/45
3,344,636  10/1967  Pugh.........................................72/60
3,328,998  7/1967  Sabroff et al..............................72/60

FOREIGN PATENTS OR APPLICATIONS

176,229  1/1966  U.S.S.R.....................................72/60

*Primary Examiner*—Richard J. Herbst
*Attorney*—Jack Schuman

[57] ABSTRACT

Disclosed herein is a process in which flowing fluids are utilized to apply viscous drag forces to a rod of indefinite length and advance it continuously through an extrusion die, to produce a continuous product, for example, a wire. The flowing fluids also control the axial and radial stresses in the rod, sealing it into and out of a treating environment so that undesirable rod pinch-off, bulging, or tension failure is avoided. The temperature, and hence viscosity, of the flowing fluids may be adjusted to control viscous drag forces.

10 Claims, 11 Drawing Figures

Patented May 8, 1973 3,731,509

Patented May 8, 1973
3,731,509
7 Sheets-Sheet 3
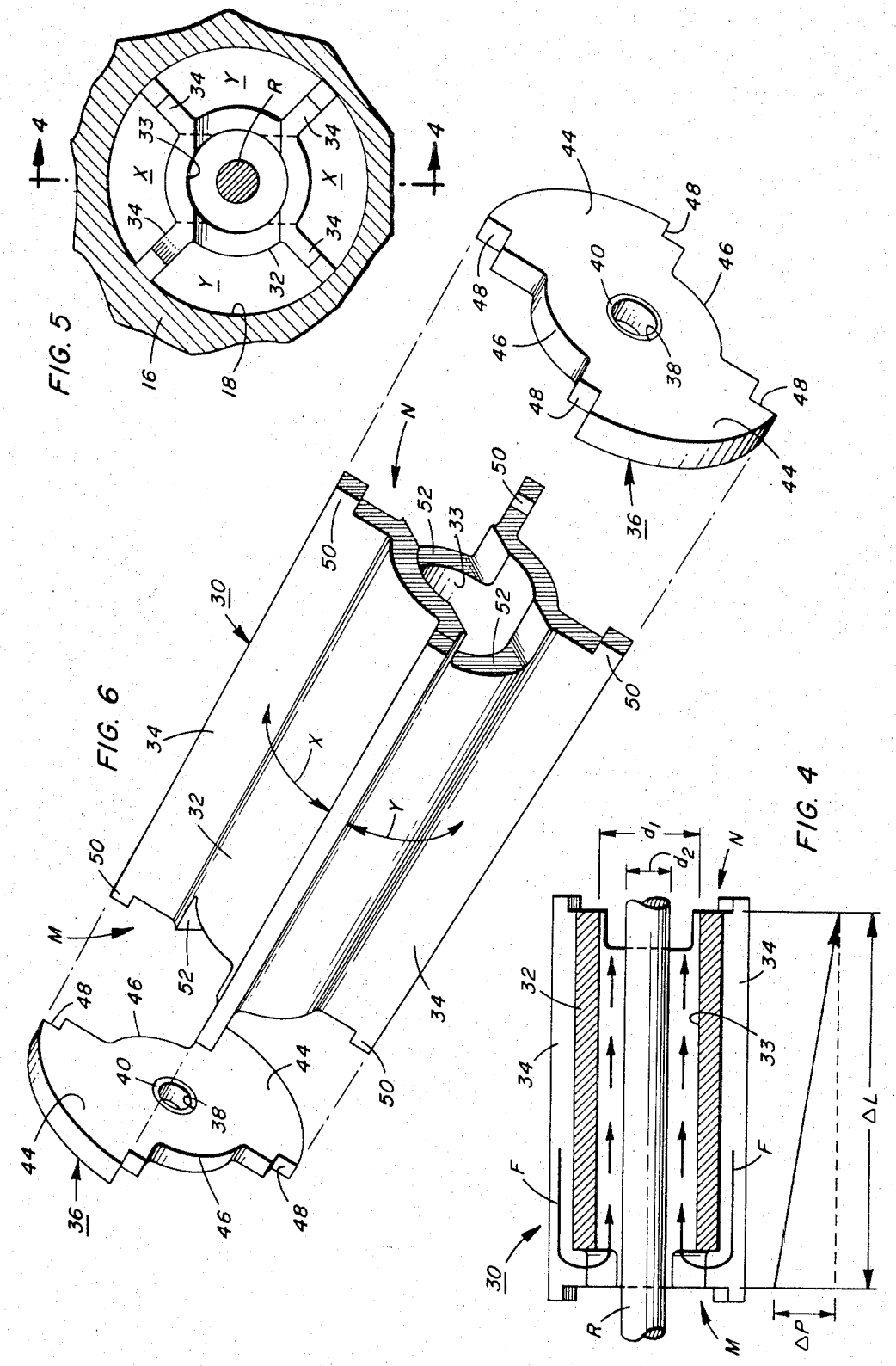

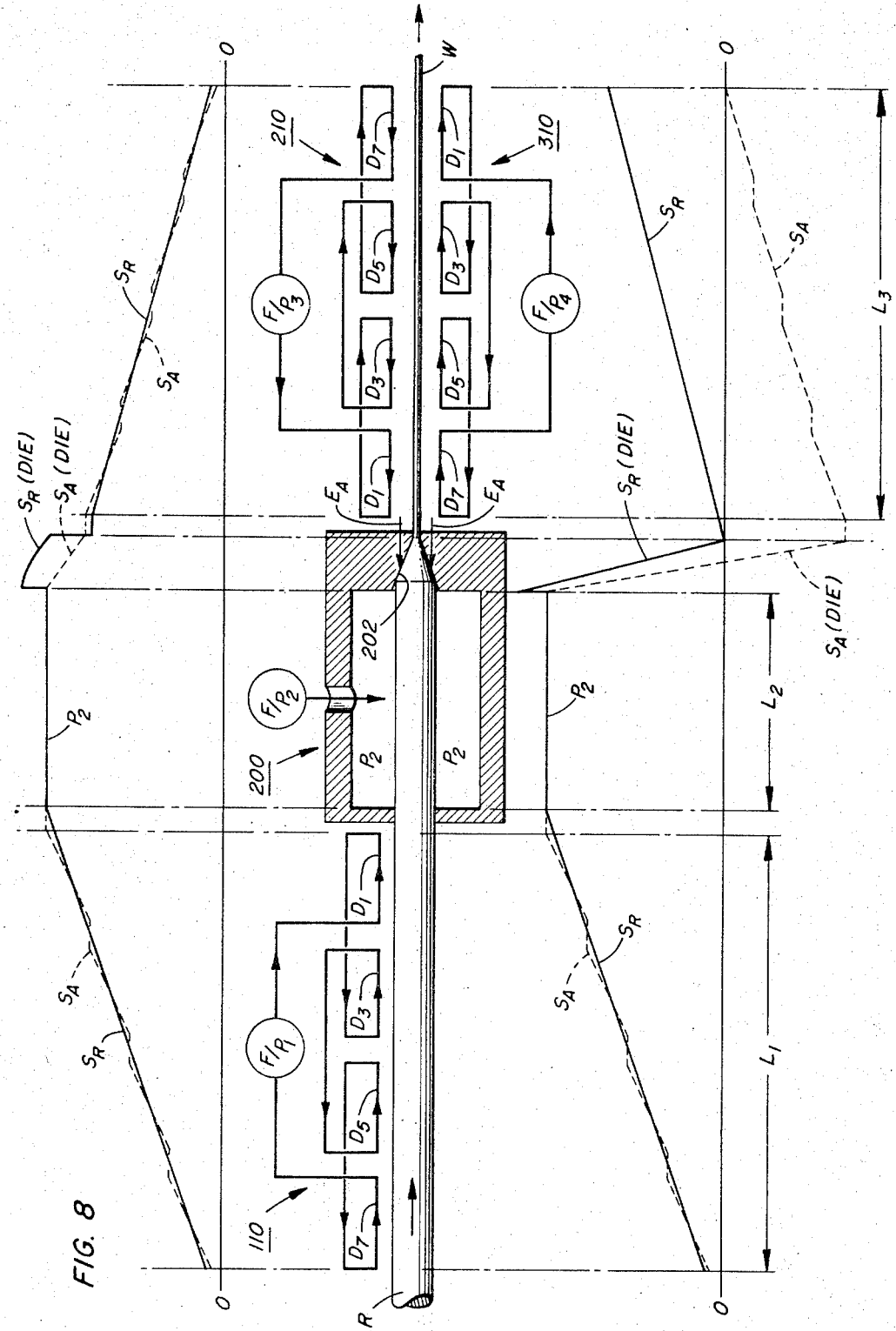

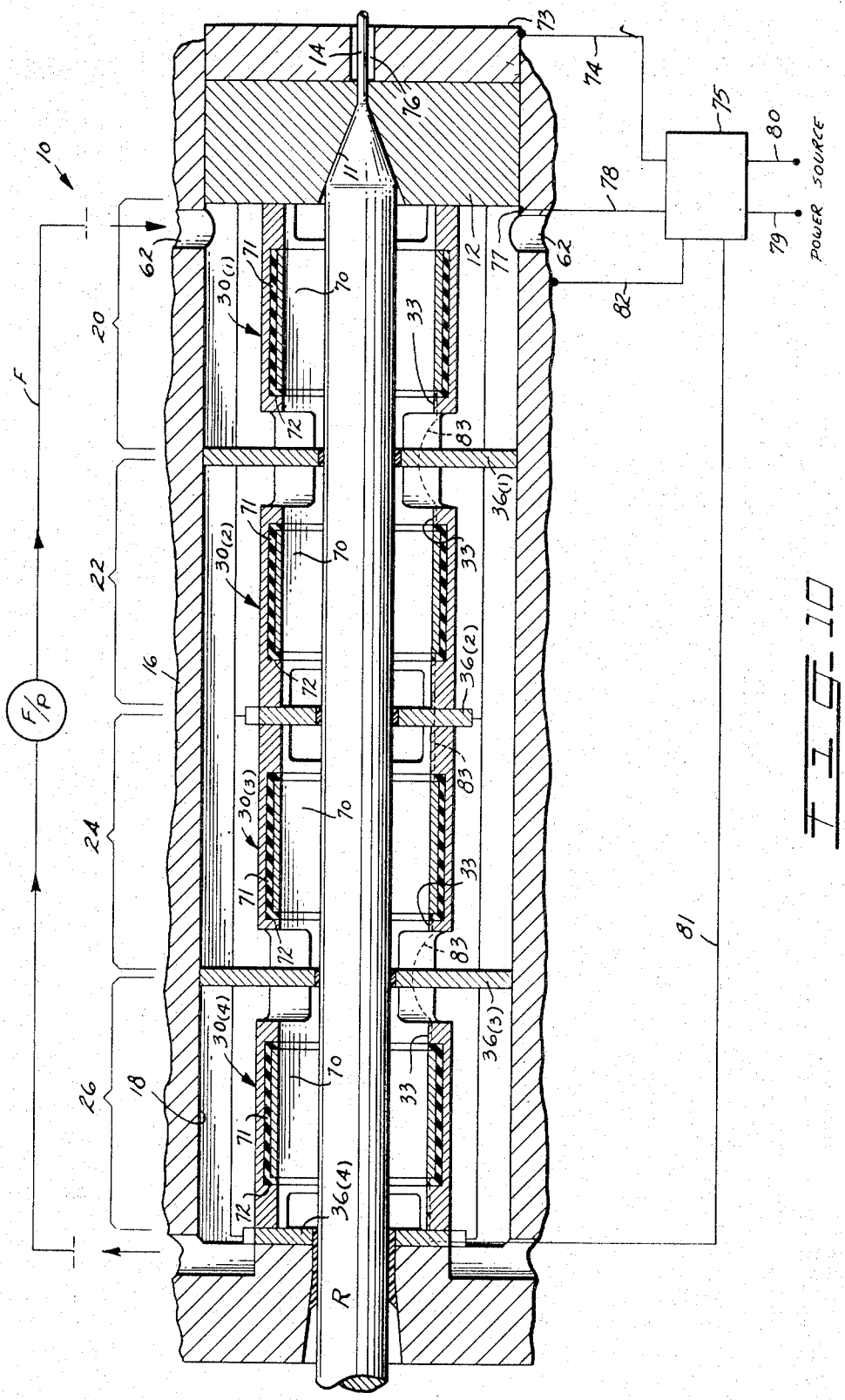

CONTINUOUS MATERIAL FEEDING AND DEFORMATION PROCESS

CROSS-REFERENCE TO RELATED APPLICATION

This application is a division of copending application Ser. No. 876,940 filed Nov. 14, 1969 and titled "Apparatus and Method for Continuous Material Feeding and Deformation Process," now U. S. Pat. No. 3,667,267, the said application Ser. No. 876,940 being pending application Ser. No. 794,488 filed Jan. 28, 1969, and titled "Continuous Material Feeding and Deformation Process."

BACKGROUND OF THE INVENTION

1. Field of the Invention

This invention relates to material feeding and treatment processes. In various embodiments, flowing fluid is utilized to control the axial stress and pressure conditions within the material, continuously advance it into and/or withdraw it from a treatment environment, especially one involving high pressure, and also to seal the material into and/or out of that environment. This invention is particularly useful in continuously advancing a rod of indefinite length through an extrusion die to produce a wire, also of indefinite length.

2. Description of the Prior Art

It is known to utilize flowing fluids to transport material. For example, yarns and threads have been conveyed in streams of flowing fluid. However, none of these prior art techniques has utilized the fluid to advance material and also to control the axial and radial stresses therein so that the shape of material is controlled as it is advanced.

Continuous materials deformation processes are known. For example, conventional wire drawing involves pulling a rod of indefinite length through a series of drawing dies, each of which reduces its size to produce a wire. Conventional wire drawing is limited because the drawing forces applied to the wire, as it is being formed, may not produce tension stresses therein which exceed the yield strength of the wire. This, and other reasons, have lead to a consideration of extrusion as a method for making wire-like products.

Various extrusion processes are also known. In some of these, a discrete billet is pressurized and forced through an extrusion die. Such processes have the disadvantage that when the billet is consumed, product formation ends, and the extrusion apparatus must be recharged with a new billet. Recharging is time-consuming and, of course, the product is not continuous but rather is produced in discrete lengths. Also, the properties of such a product may vary undesirably, especially at the ends thereof.

Other extrusion processes have been proposed in which an extrusion vessel is charged with rod, pressurized to extrude a product therefrom, depressurized, and recharged with rod, and repressurized to extrude product, in repeating cycles. In such processes the rod is not advanced continuously, nor does the product issue therefrom continuously. Therefore, they are essentially discontinuous processes, suffering both in operating speed and product uniformity.

SUMMARY OF THE INVENTION

One aspect of this invention involves the use of flowing fluids to advance material by application of viscous drag forces thereto while at the same time controlling the axial and radial stresses therein.

Another aspect of this invention involves continuously exerting upon the surface of material advancing forces, for example, viscous drag forces, which push and continuously advance the workpiece against a deforming agency, which may be an extrusion die, to produce a continuous product such as a wire.

Another aspect of this invention involves the use of viscous drag forces to advance material into and withdraw material from a pressurized environment. These fluids may be utilized to control the axial and radial stresses in the material, for example, to avoid pinch-off, bulging, or tension failure.

Yet another aspect of this invention involves the use of flowing fluids to seal and control stress gradients in the material as it is introduced into a treating environment and, where desired, to seal and control stress gradients in the material as it is withdrawn.

In still another aspect of this invention, viscous drag forces continuously advance a rod toward an extrusion die and the temperature and hence viscosity of the motive fluids are adjusted to control such viscous drag forces.

It is especially significant that in various embodiments of this invention, flowing fluids are utilized to advance and produce stresses in the material which exceed the yield strength thereof. Indeed, these stresses may greatly exceed the material yield strength, and increase the ductility of the material, enhancing the deformation thereof without fracture.

In one specific embodiment of this invention, flowing fluid is applied to the surface of a rod of indefinite length to continuously advance the rod, while controlling the axial and radial stresses therein, into an extrusion die, from which a wire, also of indefinite length, issues continuously. The axial and radial stresses in the wire may also be controlled, as desired, by flowing fluids. It is noteworthy that this, and other extrusion processes according to this invention are continuous as distinguished from the discontinuous extrusion processes mentioned above.

BRIEF DESCRIPTION OF THE DRAWINGS

These and other various aspects of this invention will be appreciated by referring to the drawings, wherein:

FIGS. 4–6 illustrate details of a flow reversal cell within the feeder of FIG. 3;

FIG. 8 is a schematic representation of continuous extrusion processes in which viscous drag rod feeders both advance rod and withdraw product wire from the process, together with graphs showing stress conditions in the rod and wire;

FIG. 10 is a view similar to FIG. 3, showing a modification employing a heating element in each of the flow reversal cells and means for controlling the flow of electrical current through the heating elements.

DETAILED DESCRIPTION

Figure 1:
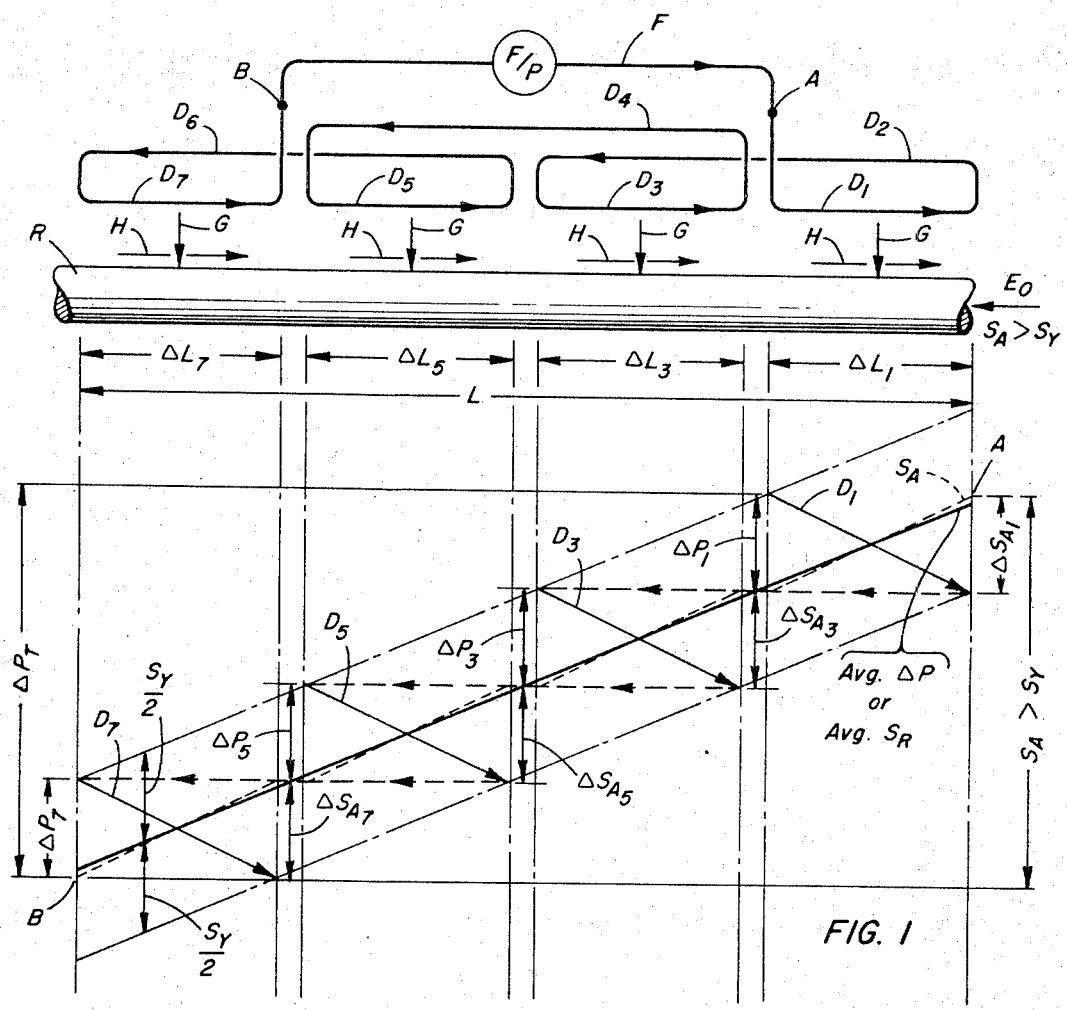
FIG. 1 is a schematic representation of a viscous drag rod feeding process involving an alternate-reverse flow pattern, together with a graph which shows the stress conditions in the rod within the process.

FIG. 1 illustrates diagrammatically the viscous drag feeding method of the present invention, employed in continuously advancing an indefinite length of rod R against an opposition force $E_O$ of sufficient magnitude to build up axial stress $S_A$ in the rod in excess of the rod yield strength $S_Y$, such axial stress $S_A$ being shown along the ordinate of the graph of FIG. 1. A viscous fluid F is pressurized by a fluid pump F/P and caused to flow in the flow pattern shown by the arrowed solid line between the points A and B. This flow pattern is referred to as an alternate-reverse flow or flow pattern. More specifically, the viscous fluid F is pumped from point A in the direction of the arrows rightwardly along the portion of the flow pattern identified as $D_1$, thence leftwardly along the portion of the flow pattern identified as $D_2$, and again rightwardly along the portion of the flow pattern indicated as $D_3$. This alternate-reverse flow is repeated, as shown, with the fluid flowing alternately rightwardly and leftwardly until it reaches the point B, whereupon it is recycled through to fluid pump F/P, repressurized, and again pumped along the described alternate-reverse flow pattern. This cycle is repeated continuously to sustain the fluid flow in this pattern.

As will be discussed in detail below, the cyclically interrupted portions of the flow pattern, $D_1$, $D_3$, $D_5$, and $D_7$, are applied respectively to rod portions $\Delta L_1$, $\Delta L_3$, $\Delta L_5$, $\Delta L_7$, which are spaced at regular intervals along the length L of rod R. However, certain features of the alternate-reverse flow pattern should be specially noted at this point.

The flow of fluid is from point A to point B, not leftward flow as seen in FIG. 1. However, the direction of flow is in the opposite direction, rightward, in flow portions $D_1$, $D_2$, $D_3$, and $D_7$. Thus, flow of fluid along the rod surface is from B to A.

As seen in the graph of FIG. 1, the total pressure drop between points A and B, $\Delta P_T$, is distributed over the flow pattern, pressure drops $\Delta P_1$, $\Delta P_3$, $\Delta P_5$, and $\Delta P_7$ being associated respectively with flow portions $D_1$, $D_3$, $D_5$, and $D_7$. These pressure drops $\Delta P$ are indicated graphically by the downward, rightwardly directed arrows $D_1...D_7$. Assuming that the pressure drop in portions $D_2$, $D_4$, and $D_6$ may be adjusted to be very small, the sum of $\Delta P_1... \Delta P_7$ is substantially equal to $\Delta P_T$.

While the flow in portions $D_1$, $D_3$, $D_5$, and $D_7$ is rightward, the pressure gradient represented by the average fluid pressures in each of these successive flow portions also increases to the rightward. This pressure gradient is shown as an inclined solid line in the graph of FIG. 1.

The fluid of flow portions $D_1$, $D_2$, $D_3$, and $D_7$ is applied to the surface of rod R at spaced intervals therealong, portions $\Delta L_1$, $\Delta L_3$, $\Delta L_5$, $\Delta L_7$, respectively. The pressure of the fluid within each of the flow portions $D_1...D_7$, indicated by arrows G on the graph, produces radial pressure stresses $S_R$ in the rod. The radial stress $S_R$ at any point is equal to the static fluid pressure producing that stress. The viscous drag forces, indicated by arrows H, exerted by the flowing fluid produce axial stresses $S_A$ in the rod, which stresses are cumulative and therefore increase from left to right as shown by the inclined dashed line on the graph of FIG. 1.

Since the radial stress $S_R$ is equal to the static pressure head in the fluid producing that stress, the radial stress increment $\Delta S_R$ over any portion of rod $\Delta L$ is also equal to the pressure drop $\Delta P$ over that portion of the rod. It follows that the inclined solid line of the FIG. 1 graph represents a plot of the average of the radial stress increments $\Delta S_R$ and also a similar plot for the average of the pressure drop $\Delta P$.

Rod pinch-off or bulging would occur if, at any point, the axial stress $S_A$ therein should differ from the radial stress therein by an amount exceeding the yield strength of the rod, $S_Y$. In accordance with this invention, the individual pressure drops $\Delta P$ are controlled so that the axial stress increments $\Delta S_A$, which are induced by the viscous drag forces H do not produce in the rod these conditions producing rod pinch-off or bulging.

The axial stress increments $\Delta S_A$ are shown by the inclined, stepped line on the graph of FIG. 1. Ideally, this line would overlie the solid line representing the average radial pressure $S_R$ in the rod, thus assuring that neither pinch-off nor bulging would occur. These conditions are illustrated in the graph. In practice, these ideal conditions may be difficult to realize. The uppermost and lowermost inclined dashed lines on the graph define the boundaries between which the axial stress $S_A$ and radial stress $S_R$ may differ at any point along the rod length L and avoid the condition producing pinch-off or bulging. These dashed lines are displaced from the plots of the average radial stress and the axial stress by an amount equal to half of the rod yield strength, or $S_Y/2$.

As noted above, the viscous drag forces H are applied to the surface of the rod. When the sum of these forces exceeds the opposition force $E_O$, the rod will be advanced against that opposition force, producing a corresponding axial stress in the rod.

Opposition force $E_O$ represents any reaction force against which the rod may be applied. It may, for example, be the reaction force exerted by an extrusion die or other agency for deforming the rod.

Figure 2:
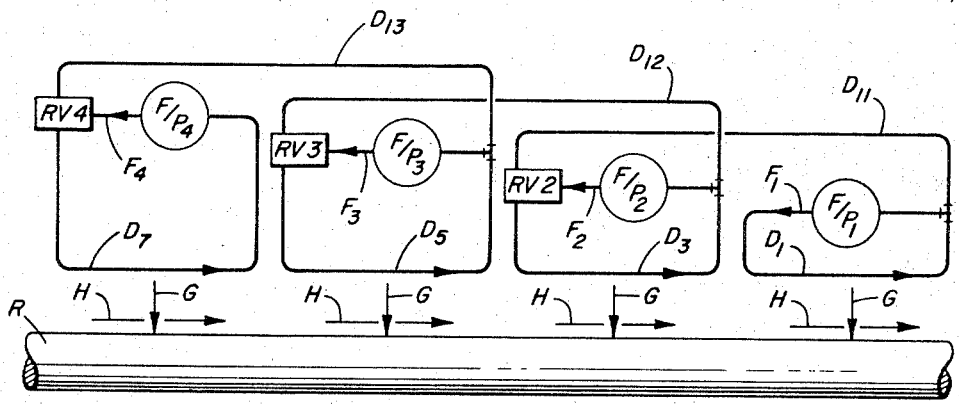
FIG. 2 is a schematic representation of an alternate viscous drag rod feeding process in which the flow of fluid is in discrete fluid currents rather than in an alternate-reverse flow pattern, the graph of FIG. 1 also being applicable to FIG. 2.

Referring now to FIG. 2, the method of the present invention may also be practiced by employing a plurality of separate or discrete fluid currents, $F_1$, $F_2$, $F_3$, and $F_4$, each fluid current providing a separate one of the flow portions $D_1$, $D_3$, $D_5$, and $D_7$. As shown in FIG. 2, such flow portions are pressurized by individual fluid pumps $F/P_1$, $F/P_2$, $F/P_3$, and $F/P_4$, respectively. To provide the relationship between the axial and radial stresses indicated by the graph of FIG. 1, pressure levels in the fluids $F_1...F_4$ are controlled by their respectively associated individual pressure ratio valves RV–2, RV–3, and RV–4, so as to bear the proper pressure relationships. For example, the pressure level or pressure drop $\Delta P$ over the flow portion $D_3$ is provided with the proper pressure relationship with respect to the pressure drop in the preceding pressurized fluid $F_1$ by pressure control valve RV–2, which controls the pressure level in the pressurized fluid $F_2$ ( and thus the pressure drop $\Delta P$ in the flow portion $D_3$) by receiving a pressure control signal from the pressurized fluid $F_1$ over control line $D_{11}$. Similarly, the pressure levels in the fluids $F_3$ and $F_4$ are so controlled by their respectively associated pressure control valves RV–3 and RV–4.

The valves mentioned above may be pressure reducing valves, or pressure ratio valves, for example, such as disclosed in copending patent application Ser. No. 769,935 filed Oct. 23, 1968.

An advantage of utilizing discrete fluid currents $F_1$, $F_2$, $F_3$, and $F_4$ is that it permits each fluid to be of a different viscosity, thus adding flexibility to the control of the above-described axial and radial stress relations. Further, if desired, this arrangement permits the use of the fluids to perform separate treatment functions upon the portions of the rod exposed thereto; for example, the fluid $F_4$ could be chosen to provide rod cleansing or descaling; the fluid $F_3$ chosen so as to provide a rinsing action; the fluid $F_2$ chosen so as to provide a chemical treating or pre-conditioning process; and fluid $F_1$ chosen so as to apply a lubricant to the surface of the rod exposed thereto.

Figure 3:
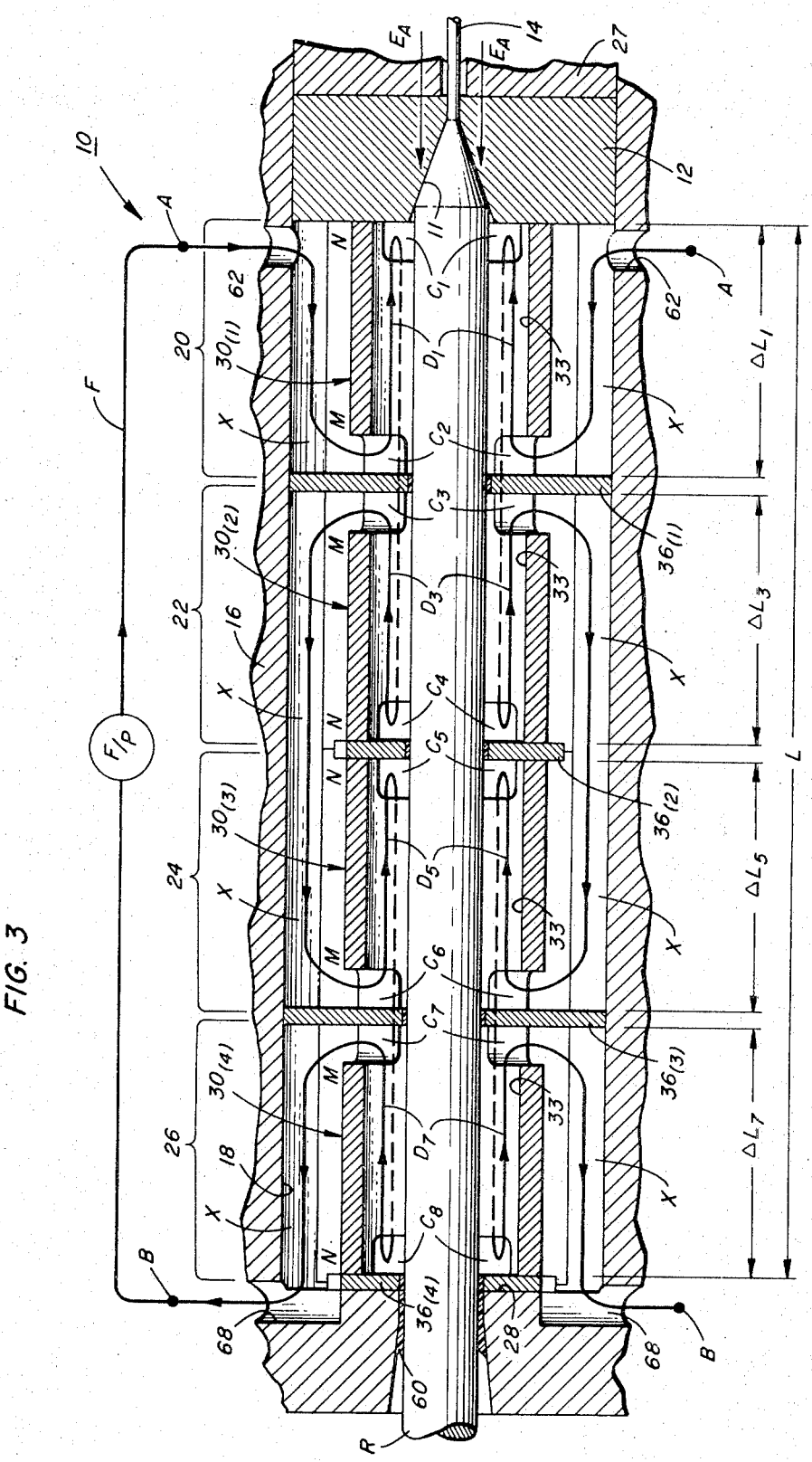
FIG. 3 shows a viscous drag rod feeder, including a series of flow reversal cells, and the fluid flow therethrough, utilized for feeding and extruding a rod to produce a wire.

FIG. 3 shows a viscous drag rod feeder 10, suitable for practicing the viscous drag feeding method of the present invention to continuously advance and extrude rod R through the orifice 11 of an extrusion die 12, to continuously form wire 14.

The feeder includes a housing 16 having a bore 18 therein for accommodating a plurality of flow reversal cells 20, 22, 24, and 26; and for accommodating the extrusion die 12. A retaining plug 27, threaded into housing 16, as shown, securely positions the extrusion die 12 and the flow reversal cells within the housing against a shoulder 28 formed within the bore 18.

Feeder 10 provides pressurized viscous fluid F with an alternate-reverse flow pattern, as indicated by the dual solid and dashed lines and the arrows thereon; the fluid F being driven continuously through the reversal cells 20, 22, 24, and 26 of the feeder by the fluid pump F/P. $D_1$, $D_3$, $D_5$, and $D_7$ represent the annular, linearly interrupted flow portions of the alternate-reverse flow applied, respectively, to rod portions $\Delta L_1$, $\Delta L_3$... $\Delta L_7$ within flow reversal cells 20, 22, 24, and 26. This flow pattern will be more readily understood by the detailed explanation set forth below of the structure of a representative flow reversal cell, and the manner in which the flow reversal cells are arranged within the feeder housing 16.

The pressure drops $\Delta P$ of flow portions $D_1$, $D_3$...$D_7$, as taught above, are controlled so that at any point along rod length L, the axial stress $S_A$ and radial stress $S_R$ in the rod do not differ by an amount greater than the yield strength of the rod, $S_Y$. Additionally, as before, the pressure drops $\Delta P$ are controlled so that the applied viscous drag forces H are of sufficient magnitude to continuously advance and extrude the rod R through the extrusion die 12, that is, against the force $E_A$. In this example, $E_A$ is sufficiently great that the axial stress $S_A$ built up in the rod by feeder 10 will exceed the yield strength of the rod material $S_Y$.

Referring to FIGS. 4–6, each flow reversal cell includes a universal cell insert, indicated generally at 30, which includes a generally cylindrical, longitudinally extending central body portion 32 having a central bore 33, and a plurality of integrally formed, radially disposed, longitudinally extending ribs 34. As shown in FIGS. 4 and 5, the inner diameter $d_1$ of bore 33 is larger than the diameter $d_2$ of the rod R. The opposite ends of each cell insert 30, as shown in FIG. 6, are designated respectively M and N faces. When assembled and positioned in the bore 18 of the feeder housing 16, as best seen in FIG. 5, the central body portion 32 and ribs 34 of the cell insert provide, in combination with the surface of the bore 18, a plurality of radially disposed and circumferentially spaced channels, alternate channels being designated X and Y channels.

Each cell 30 also includes a pair of barrier plates 36, FIGS. 3 and 6; and as will be noted in FIG. 3 the barrier plates between adjacent flow reversal cells are common to both cells. As best seen in FIG. 6, each barrier plate 36 is a partial disk having an outer diameter equal to the inner bore 18 of the feeder housing 16. Each barrier plate is provided with a central bore 38 into which is suitably press-fitted a seal 40 whose inner diameter is dimensioned to slidingly accommodate the passage therethrough of the rod R. This seal may be made, for example, of Teflon. The barrier plates are also provided with imperforate blocking areas indicated generally at 44 which, as will be discussed in detail infra, reverse and redirect the flow of the pressurized viscous fluid F. Diametrically opposite portions of the barrier plates have been removed at 46 so as to permit free flow of the pressurized fluid thereacross. For contiguous assembly with the cell insert 30, the barrier plates 36 are provided within portions 48 dimensioned to closely receive the extending portions 50 of insert ribs 34. As seen in FIG. 6, identical barrier plates 36 are assembled to opposite ends of the cell insert 30, and when so assembled, are rotated 90° with respect to each other.

Referring again to FIG. 3, cell inserts 30(1), 30(2), 30(3), and 30(4), comprising the respective flow reversal cells 20, 22, 24, and 26, are assembled such that the M and N faces are reversed for adjacent flow reversal cells, that is, the M faces of flow reversal cells 20–22 and 24–26 are opposite to each other across an intervening barrier plates 36(1) and 36(4), and the N faces of the flow reversal cells 22–24 are opposite to each other across an intervening barrier plate 36(2). When so assembled, the X-channels and the Y-channels of all the flow reversal cells are aligned with one another.

Further, when the barrier plates 36 are assembled to the cell inserts as shown in FIG. 3, with each plate being angularly displaced 90° with respect to the adjacent plate, the imperforate portions 44 of the barrier plates and the portions of the barrier plates removed at 46, alternately from right to left, block and connect the aligned X-channels as shown, and alternately from right to left (not shown in FIG. 3) connect and block the aligned Y-channels.

As seen in FIG. 6, portions of the ends of the central body portion 32 of the flow cell insert 30 have been removed at 52; such removed portions being diametrically opposite each other at each end, with the portions 52 at opposite ends being angularly displaced from each other by 90°. The removed body portions 52, upon the barrier plates 36 being assembled as suggested above and indicated in FIG. 6, provide, in cooperation with the imperforate portions 44 of the barrier plates, fluid communication channels $C_1$, $C_2$...$C_8$. As best seen in FIG. 3, when the flow reversal inserts 30 and barrier plates 36 are assembled and aligned as shown, the communication channels $C_1$, $C_4$, $C_5$, and $C_8$ pace the central bores 33 of of the flow reversal cells in communication with the Y-channels; and the communication channels $C_2$, $C_3$, $C_7$, and $C_8$ place the central bores 33 in communication with the X-channels.

Referring again to FIG. 3, in operation, rod R is passed through an input seal 60 (similar to barrier plate seals 40) provided in the rear of the feeder housing 16, through the aligned central bores 33 of the flow reversal cells 26, 24, 22, and 20, and the bores 38 of the seals 40 of the barrier plates 36, and into orifice 11 of extrusion die 12. The fluid pump F/P is actuated to pressurize and pump fluid F to point A, and from point A through the input ports 62 provided in the housing 16, which input ports are in fluid communication with the X-channels of the first flow reversal cell 20. The pressurized fluid is divided and flows leftwardly through the two X-channels of the first flow reversal cell 20 and through the communication channels $C_2$ where the fluid is reunited and flows into the annular space between the rod R and the bore 33 of the first flow reversal cell insert 30(1). The fluid flows rightwardly along the surface of the rod R as indicated by the linearly interrupted flow portions designated $D_1$–$D_1$. (As mentioned above, the dual arrows $D_1$–$D_1$ are representative of an annular flow and not two separate flow paths as when the fluid P is flowing through the diametrically separated X-channels.) The fluid flows rightwardly along the surface of the rod length $\Delta L_1$ residing in the first flow reversal cell 20, and as discussed with regard to FIG. 1, applies to the rod radially acting pressure indicated by the arrows G and longitudinally acting viscous drag forces indicated by the arrows H.

Upon reaching the face of the extrusion die 12, fluid F is diverted or redirected through the fluid communication channels $C_1$ into the Y-channels of the flow reversal cell 20, and as indicated by the dashed lines, the fluid flows leftwardly through the aligned and connected Y-channels of the flow reversal cells 20 and 22. Upon reaching the imperforate or blocking portions 44 of the barrier plate 36(2), the fluid is diverted and redirected through the fluid communication channels $C_4$ into the annular space between rod R and the central bore 33 of the second flow reversal cell insert 30(2). As indicated by the arrows $D_3$–$D_3$, the fluid rightwardly along the length $\Delta L_3$ of the rod R residing in the second flow reversal cell 22, where it applies the aforementioned axial and radial stress increments to the rod R along length $\Delta L_3$.

Upon reaching the imperforate or blocking portions 44 of the barrier plate 36(1), the pressurized fluid P is again diverted and flows leftwardly through the fluid communication channels $C_3$ into and through the aligned and connected X-channels of the flow reversal cells 22 and 24. Upon reaching the blocking or imperforate portion of the barrier plate 36(3), the fluid flows through communication channels $C_6$ into the annular space between the surface of the rod and the bore 33 of the flow reversal cell insert 30(3). As indicated by arrows $D_5$–$D_5$, the fluid flows rightwardly along the surface of rod length $\Delta L_5$ in the third flow reversal cell 24, building up axial and radial stress increments in that portion of the rod. Upon reaching the imperforate or blocking areas 44 of the barrier plate 36(2), the fluid is diverted or redirected through the communication channels $C_5$ and into the Y-channels of the flow reversal cells 24 and 26. The fluid, in the foregoing described manner, is directed rightwardly through the fourth flow reversal cell 26 by barrier plates 36(4) and 36(3), then leftwardly through the Y-channels of the flow reversal cell, and through exit ports 68, to point B. At this point, suitable fluid cooling may be provided. The fluid returns to the fluid pump F/P where it is repressurized and recycled through the alternate-reverse flow pattern described above.

The sum of the viscous drag forces imparted to the rod, as described above, advances the rod against the opposition force $E_A$ exerted on the rod by extrusion die 12, and the rod is continuously extruded as wire 14. Thus, in the example described above, rod R of indefinite length is continuously received within the viscous drag rod feeder 10, there pressurized, and, by application of viscous drag forces, fed against a deforming agency, extrusion die 12, and continuously extruded therefrom as a wire 14 of indefinite length.

To advance and extrude a rod R of a given diameter $d_2$ with the viscous drag feeding method of the present invention, the flow reversal cell design criteria set forth below have been found to provide satisfactory results. These design criteria are based on a stationary rod R, a stationary flow reversal insert 30, and a flowing viscous fluid. Referring to FIG. 3, and recalling from the foregoing that the radial stress increment $\Delta S_R$ across a flow cell $\Delta L$ is equal to the pressure drop $\Delta P$ thereacross:

1. The pressure drop $\Delta P$ in the viscous fluid, across the length $\Delta L$ of flow reversal cell 30, will not exceed the yield strength of the rod $S_Y$, and the drop $\Delta P$ is made equal to the axial stress increment $\Delta S_A$ built up in the portion of the rod $\Delta L$ residing in the cell insert 30, i.e., $\Delta P = \Delta S_A$.

2. The total force required to pump the fluid through the annular space between the rod and the bore 33 of the cell insert 30 is equal to $(d_1^2 - d_2^2)(\pi/4) \Delta P$, which $d_1$ is diameter of the cell bore and $d_2$ is the diameter of the rod.

3. It is assumed that the total force required to pump the fluid through the annular space will be dissipated proportionately between the surface of the rod and the surface of the cell bore (as indicated by the arrows therealong) in accordance with the relative surface areas. Thus, the portion of such total force dissipated on the rod surface will be equal to $(d_1^2-d_2^2)(\pi/4) \Delta P (d_2/d_1 a 2 d_2)$.

4. The axial force increment generated in the rod by the viscous drag of the flowing fluid along the surface thereof, is equal to $\Delta S_A d_2^2 (\pi/4)$.

5. Also, the axial force increment generated in the rod is equal to the proportional force dissipated on the surface of the rod by the flowing fluid. Thus, the expressions of paragraphs (3) and (4) must be equal to each other; therefore:

$$(d_1^2-d_2^2)(\pi/4) \Delta P (d_2/d_1+d_2) = S_A d_2^2 (\pi/4).$$

Since from paragraph (1), $\Delta P = \Delta S_A$, these terms cancel out and the equation can be solved to show that the cell bore diameter $d_1$ is equal to twice the rod diameter $d_2$, i.e., $d_1 = 2d_2$.

As noted above, the above design criteria are based on a stationary rod, of course such condition changes for rod advancement, and it has been found that in actual practice the cell bore diameter $d_1$ must be greater than twice the rod diameter $d_2$. For example, to advance and extrude aluminum rod at a rate of 34 feet per minute with a 17 percent reduction in rod area, a flow reversal cell bore $d_1$ equal to 2.2 times the rod diameter $d_2$ has been found to provide satisfactory results.

It will also be noted from the above design criteria, in particular paragraph (5), that the diameter $d_1$ of the bore of flow reversal cell insert 30 is dependent only on the diameter $d_2$ of the rod. The following equation provides the necessary interrelationship between other factors, each one of which can be varied with respect to the others:

6. $\Delta P = (\nu LQ/9,833,102 [d_1-d_2/2)] 3 d_2)$ where:
$\Delta P$ = pressure drop across the flow reversal cell.
$\nu$ = viscosity of the fluid $P$ in centistokes at room pressure.
$L$ = length of the flow reversal cell in feet.
$Q$ = rate of fluid flow $P$ through the annular space between the rod $R$ and the bore 33 of the cell insert 30, in cubic inches per minute.
$d_1$ and $d_2$ = the cell bore diameter and rod diameter, respectively (in the relationship taught in paragraph (5) above), in inches.

It will be understood by those skilled in the art that practical considerations will make their usual import felt in using the equation of the foregoing paragraph (6). For example, having chosen a $\Delta P$ in accordance with the design criteria of paragraph (1), i.e., some value less than the yield strength of the material or rod to be advanced, and having determined the relationship between $d_1$ and $d_2$ in accordance with paragraph (5), the viscosity $\nu$ and hence the fluid to be chosen, the length of the flow reversal cell L, and the flow rate $Q$, may each be varied with respect to the other. The viscosity $\nu$ and flow rate $Q$ may be chosen, for example, with practical regard to the commercial availability of correspondingly appropriate fluids and fluid pumps.

In an embodiment of the present invention, using the foregoing design criteria, aluminum rod having a yield strength of approximately 5,000 psi was advanced at the rate of 34 feet per minute and extruded at an extrusion pressure of approximately 10,000 psi through a conical die (included angle of 40°), with the rod experiencing a 17 percent reduction in rod area. The viscous drag rod feeder employed included forty flow reversal cells and each was 2.5 inches in length. The rod diameter $d_2$ was 0.296 inch and the cell bore diameter $d_2$ of the flow reversal cell inserts was 0.651 inch. The rate of flow $Q$ was 126 cubic inches per minute, and $\Delta P$ across each flow reversal cell was, on the average, approximately 250 psi. The viscous fluid employed had a room pressure viscosity of 2,000,000 centistokes and was comprised of 50 percent by volume of polyethylene micropowder and 50 percent by volume of 5,000,000 centistokes (room pressure) silicone fluid.

In general, the viscous fluids which may be utilized in practicing this present invention should provide good wetting action upon the material or rod to be advanced, and, for convenience, fluids should have minimal viscosity variation with respect to pressure, temperature, and shearing rate.

With general reference to the fluid pumps which may be utilized to pressurize and pump the viscous fluid F, double-acting or dual-piston pumps which provide a continuous output at the appropriate pressure level discharge capacity Q, are preferable. However, for a given continuous run, a single piston pump having a suitably large reservoir would be satisfactory.

With regard to the dimension of the X-channels and the Y-channels, such channels are made sufficiently large that any pressure drop experienced by the fluid in passing through these channels is small with respect to the pressure drops $\Delta P$. Thus, the overall pressure drop $\Delta P$ experienced by the fluid between points A and B, is substantially distributed over only the linearly interrupted flow portions $D_1$, $D_3$...$D_7$. With regard to the foregoing example and specific viscous drag rod feeder, the distance between the outer surface of the central portion 32 of the fluid cell insert 30 and the surface of the bore 18 of the housing 16, was 0.375 inch. The width of each barrier plate was 0.125 inch.

Figure 7:
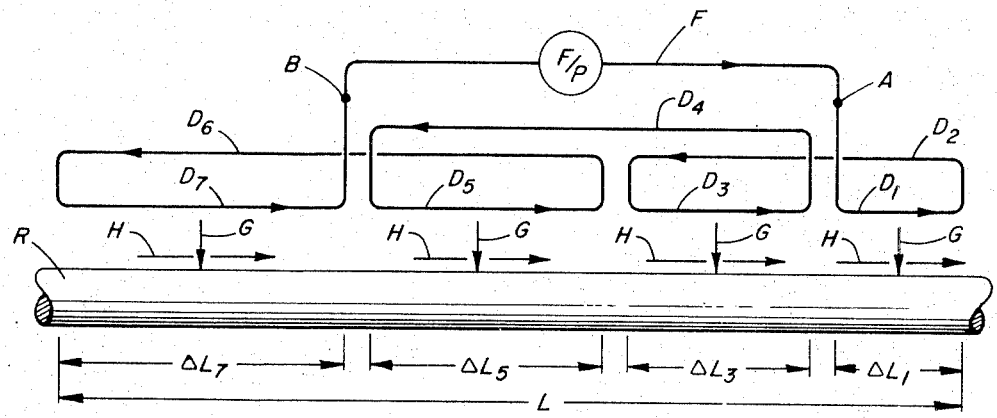
FIG. 7 is a schematic representation of a viscous drag rod feeding process, involving alternate-reverse flow, but in which the individual flow portions vary in length in relation to pressure-induced viscosity changes in the fluid thereof.

FIG. 7 illustrates diagrammatically a further embodiment of the present invention similar to that of FIG. 1, but wherein the flow portions $D_1$, $D_3$, $D_5$, and $D_7$ of an alternate-reverse flow are of varying length, in particular, wherein such lengths vary in proportion to the overall pressure drop (from A to B) of the pressurized fluid F. As is known, the viscosity of a given fluid varies with pressure, usually decreasing with decreasing pressure. Thus, it will be understood that the viscosity of the fluid will decrease as the fluid generally drops in pressure from point A to point B.

Accordingly, the efficiency of a viscous drag feeder, such as that shown in FIG. 3, may be enhanced by increasing the length of the flow reversal cells, from right to left. Thus, utilizing the formula of paragraph 6 and the foregoing design criteria, one can further assure the maintenance of a desired pressure drop $\Delta P$ across each flow reversal cell by calculating a separate flow cell length L in accordance with the particular viscosity the pressurized fluid will have when flowing therethrough. By so varying the length of the flow reversal cell, it is possible to provide a given increasing axial stress gradient over a shorter length of material, and hence by means of fewer flow reversal cells, than would otherwise be possible with flow cells of equal length and with a fluid decreasing in viscosity in the direction of flow therethrough.

FIG. 8 shows a high pressure material treating process to which continuous access, both with respect to input and output, is gained in accordance with the principles of this invention. Very generally, a rod R of indefinite length proceeds continuously from atmospheric or room pressure through a stream of flowing fluid, into a high pressure material treating process, illustrating an extrusion process, and through a second stream of flowing fluid to return to room pressure. The streams of flowing fluid seal the rod (and product) into and out of the treating process, controlling the pressures, pressure gradients, and axial stresses in the rod, and exerting viscous drag advancing or motion opposing forces thereon.

More specifically, FIG. 8 shows an input viscous drag feeder 110, a high pressure chamber 200, and an output viscous drag feeder 210, 310 which may function, as desired, in various modes of operation, for example that shown for a feeder 210 or that shown for a feeder 310. The feeders may be, for example, as illustrated and described with reference to FIGS. 1–7, that of FIG. 3 being shown.

In the illustrated process, a rod of indefinite length R is advanced by feeder 110, into high pressure chamber 200 which is filled with a suitable pressure transmitting fluid pressurized to a level $P_2$ by pump $F/P_2$, and passed through an extrusion die 202, to continuously form a wire W.

As indicated by the arrows, flow portions $D_1$, $D_3$...$D_7$ of the output viscous drag feeder 210 apply viscous drag forces to the rod R which act in opposition to the viscous drag friction forces applied to the rod R by feeder 110. On the other hand, flow portions $D_1$, $D_3$...$D_7$ of the output feeder 310 apply viscous drag friction forces to the rod R which aid or act in concert with the viscous drag forces applied to the rod R by the feeder 110.

While the feeder 210, 310 is shown for comparison in FIG. 8 as two different feeders, in actual practice, one output feeder would be operated as desired, to apply viscous drag friction forces to the rod acting in either direction. Returning briefly to FIG. 3, viscous drag rod feeder 10 is a bilateral fluid device which may be pumped or exhausted from either end. If the port 62 is made the input port, flow portions $D_1$, $D_3$...$D_7$ will apply rightwardly acting viscous drag forces, as shown in FIG. 3 However, if fluid F is pumped into port 68, the fluid will be provided with an alternate-reverse flow opposite of that shown in FIG. 3, and the flow portions will apply leftwardly directed viscous drag forces. When the output feeder is operated in the manner of feeder 210, it will be referred to as operating in the "backward mode;" conversely, when operating in the manner of feeder 310, it will be referred to as operating in the "forward mode."

Generally, input feeder 110 provides continuous input access to the high pressure chamber 200; and the output feeder 210, 310 provides continuous output access to the chamber. Additionally, the input and output feeders build up axial and radial stress gradients in the material of rod R entering and exiting the chamber, such gradients being controllable to match the axial and radial stress conditions experienced by the material when entering and exiting the high pressure chamber. Further, as discussed with reference to FIGS. 1–3, such gradients may be controlled so that at no point within the feeders does the axial stress $S_A$ in the rod depart from the radial stress $S_R$, by an amount greater than the rod yield strength, $S_Y$. Thus, rod pinch-off, bulging, and tension failure may be prevented.

Depending upon the specific characteristics of the continuous process to be performed, for example an extrusion process, and considering such factors as the material and yield strength of the rod, the percentage reduction to be achieved, the desired rate of extrusion, the need for back pressure or pulling force a the exit end of the die, and the like, the output viscous drag feeder 210, 310 may be operated either in the forward or backward mode of operation. Further, for a given process and considering "start-up," "continuous operation" for a period, and "shut-down," the output feeder may be operated in different modes at different times.

Assume, for example, that for a given extrusion process it is desirable or necessary to pressurize the material of rod R to a level greatly in excess of its yield strength, say four times that level, so as to increase the ductility of that material and facilitate its extrusion, without fracture through die 202. Feeder 110 would be provided with sufficient flow reversal cells and driven to build up in the rod, against the reaction forces $E_A$ exerted by the die, an axial stress $S_A$ in length L, four times as great as the yield strength, $S_Y$. The feeder 110 would also apply radial stress $S_R$ to the rod at no point differing from the axial stress $S_A$ in the rod by an amount exceeding the rod material yield strength, $S_Y$. Simultaneously, the fluid in chamber 200 would be pressurized to a level $P_2$ substantially equal to the pressure level of $P_2$. These radial pressure and axial stress relationships are illustrated in the upper graph of FIG. 8.

Under these conditions, material being deformed in passing through the die is also highly pressurized and increased in ductility as desired.

Referring to FIG. 8 and the upper graph thereof, output feeder 210, operating in the backward mode may be used to facilitate smooth extrusion start-up, to start up extrusion where the rod is highly pressurized to increase its ductility, and to maintain extrusion where back pressure on the extrusion product, for example wire W, is necessary or desirable.

It is well known that smooth start-up of extrusion may be facilitated by applying back pressure to the extrusion product. Feeder 210, running in the backward mode may apply this back pressure upon wire W as it emerges from die 202.

The start-up of extrusion where the rod must be in a highly pressurized state, in order to take advantage of the aforementioned ductility increase, may be especially difficult, or even impossible, in the absence of such back pressure. For example, in a particular extrusion situation, the reaction forces, $E_A$, exerted by the die may not be sufficient to build up the necessary pressures in the material being extruded. Operation of feeder 210 in the backward mode, against the action of input feeder 110, and the confining pressure $P_2$ within chamber 200 may assure the necessary rod pressurization and ductility increase as extrusion is initiated.

Once this condition is reached, feeders 110 and 210 are preferably controlled so that the rightwardly acting viscous drag friction forces applied to the rod by the input feeder gradually overdrive the leftwardly acting forces applied by the output feeder. Thus, smooth extrusion start-up is accomplished with the rod extrusion from the immediate inception, being performed with the portion of the rod undergoing deformation in a desired state of increased ductility. Further, once such extrusion is so begun, the output feeder can continue to be operated in the backward mode, at the appropriate relationship with respect to the input feeder 110, to provide back pressure to the extrusion process and also prevent, or assist in preventing, post extrusion fracture.

It is known in the art that many materials, especially brittle materials, for example, bismuth and beryllium, can best be extruded when in net compressional stress greatly in excess (for to five times) of their yield strength. For example, a typical beryllium material may have a yield strength in the order of 50,000 psi.; however, due to its brittleness, large percentage reductions in area by extrusion can be more readily accomplished (if at all) when the beryllium is subjected to net compressional stress four to five times its yield strength. If not sufficiently pressurized, it may be expected that post-extrusion fracture will occur. Further, to avoid post-extrusion fracture when the extrusion product is returned to atmospheric or room pressure, the compressional stress present in the material must be reduced while maintaining properly related, decreasing axial and radial stress gradients which range between the immediate post-extrusion stress as in the rod and atmospheric or room pressure stress conditions. Viscous drag feeder 210 operating in the backward mode, uniquely meets the foregoing requirements.

Reference will now be made to the continuous forming method of the present invention illustrated by the bottom graph of FIG. 8, wherein the output viscous drag feeder 310 is operated in the forward mode. As suggested above, when the output feeder 310 applies viscous drag forces acting rightwardly as indicated by the arrows in the flow portions $D_1$, $D_3$...$D_7$, such forces build up an axial stress gradient in the length of rod $L_3$, which gradient increases in the direction of the rod advancement. Such forces assist input feeder 110 by pulling the rod through the die 202.

As an illustration, it will be assumed that the yield strength of the rod R and the percentage of area reduction to be imparted to the rod by extrusion through the die 202, are such that the extrusion pressure required is 10,000 psi. Such extrusion may be accomplished with the axial and radial stresses built up in the rod length $L_2$ at the die 9,000 psi, if the output feeder 310 also applies a pulling force on the wire W sufficient in magnitude to provide the additional 1,000 psi.

In some operations, finer control and smoother extrusion may be realized by both pushing with feeder 110 and pulling with output feeder 310, the pushing and pulling forces together cooperating to pass the rod through die 202.

The lower graph of FIG. 8 shows the axial stress $S_A$ and radial $S_R$ in rod R when pushed and pulled in accordance with this mode of operation. It is noteworthy that the portion of the rod within die 202 experiences an axial stress transition, from compression to tension. Thereafter, the tensile stress in the wire W is gradually relaxed to zero as the wire progresses through output feeder 310. In order to avoid pulling the wire in two, the output feeder is controlled so that the sum of the tensile and radial stresses in the wire do not exceed the yield strength of the wire material, causing it to fail in tension.

In some operations, it may be desirable to deform material such as rod by pulling it against or through a deforming agency, perhaps a drawing die. Output feeder 310 may be operated to accomplish this with or without the assistance of input feeder.

Figure 9:
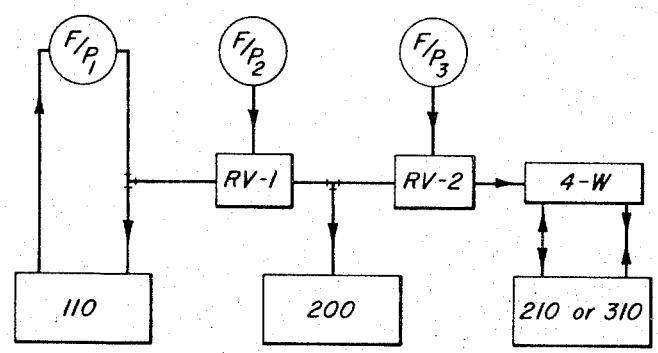
FIG. 9 is a diagram of a hydraulic control circuit for the processes illustrated in FIG. 8.

FIG. 9 is a diagram of a fluid control circuit suitable for controlling the fluid pumps $F/P_1$, $F/P_2$, and $F/P_3$ of FIG. 8 to assure that the pressure levels $P_1$, $P_2$ and $P_3$ bear the proper pressure relationships to each other. More specifically, the adjustable pressure control valve RV-1 receives a pressure signal at pressure $P_1$ over the interconnecting control line as shown, and, in accordance with its adjustment, controls the pressure level $P_2$ provided by pump $F/P_2$. Similarly, adjustable pressure control valve RV-2 assures that pressure level $P_3$ bears the proper pressure relationship to pressure level $P_2$. Further, the output from valve RV-2 may be fed into a four-way valve 4W as shown, so that simple reversal of the four-way valve reverses direction of flow through the output viscous drag feeder, thereby providing a convenient manner of selectively operating the output feeder in either the backward mode or in the forward mode.

The above-mentioned valves may be pressure relief valves or pressure ratio valves, for example, valves as disclosed in the aforementioned copending patent application.

From the discussion of FIG. 8, it will be appreciated that viscous drag feeder 110 operates as an input seal, more specifically a continuous access, pressure gradient, input seal, which permits material, for example, rod R, to be introduced into and advanced continuously through a high pressure chamber wherein the material is subjected to pressure $P_2$ which may exceed the material yield strength. This pressure gradient seal can be most readily appreciated from the plot of the average pressure $P_1$ or $S_R$ along the length $L_1$ in feeder 110 and the plot of the pressure $P_2$ or $S_{R_2}$ in length $L_2$ in the pressure vessel 200, such plots meeting at common points. The pressure range of this seal may be extended from zero, or room pressure, upwardly to any elevated pressure (limited only by practical considerations) by the mere provision of additional flow reversal cells, FIGS. 3–6, over which to drop or distribute the total pressure drop of the desired pressure range.

It will also be appreciated that drag feeders 210 and 310 operating as described with reference to FIG. 8 operate as continuous access, pressure gradient, output seals with the same desirable features and characteristics ascribed above to the input feeder 110. Thus, the input and output viscous drag feeders operating as described, and in conjunction with the extrusion process described above, constitute a high pressure material treating operation with continuous entrance and exiting access, through continuous input and output, pressure gradient, seals.

FIG. 8 shows rod R passing into extrusion die 202 and wire W extending therefrom, the illustrated extrusion processes being in the dynamic condition. Startup of those processes may be facilitated by suitable rod preparation. For example, the rod end first presented to the die may be prepared by the process of copending patent application Ser. No. 758,732, filed Sept. 10, 1968. It may also be machined or otherwise provided with a leader of wire having the dimensions of wire W, suitable for introduction into the output feeder.

On occasion, it may be required to adjust the viscous drag frictional forces applied to rod R, for instance, to maintain the proper relationship between $S_R$ and $S_A$ as hereinbefore described, when proceeding from starting to full speed operation wherein the rod R will be accelerated from zero velocity to an operating velocity of perhaps 40 feet per minute thus necessitating the application of viscous drag frictional forces on the rod R of appropriately varying magnitude.

Adjustment of viscous drag frictional forces on rod R can, of course, be made by suitably controlling the pump rate. However, this may require the expenditure of large amounts of power to accelerate the viscous fluid, and the total amount of viscous drag applied to the rod R and to the wall of the cell bore 33 will accordingly be increased. I have discovered that the magnitude of the viscous drag frictional forces on rod R can be varied as required without adjusting the pump rate and without varying the total viscous drag frictional forces generated by the viscous fluid on both the rod R and the wall of the cell bore 33. Specifically, I have discovered that the proportion of total viscous drag frictional forces dissipated between the rod R and the wall of the cell bore 33 can be varied.

Figure 11:
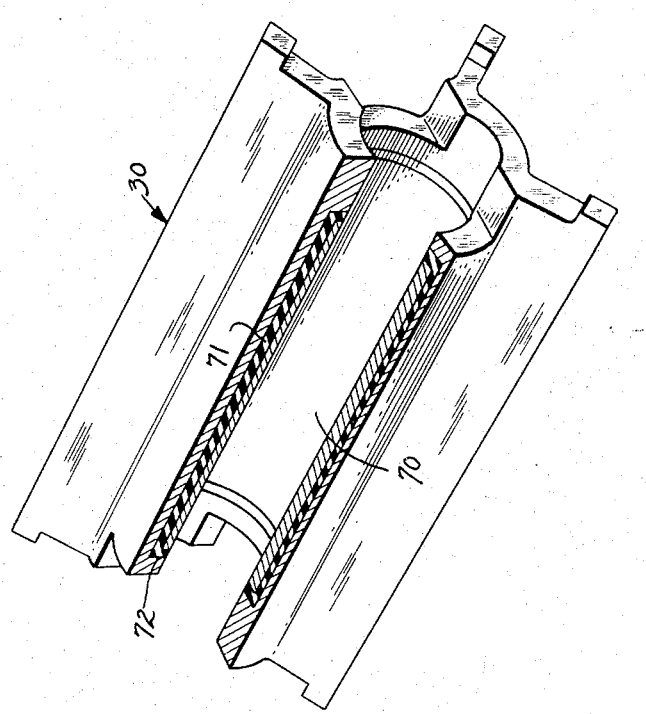
FIG. 11 is a view similar to FIG. 6, showing in perspective a typical cell insert, partially broken away to show the heating element employed with the modification illustrated in FIG. 10.

In the modification shown in FIGS. 10 and 11, means are provided to automatically maintain the proper relationship between $S_A$ and $S_R$ (viz., the difference between $S_A$ and $S_R$ must not exceed the yield strength, $S_Y$, of the rod R) by varying the proportion of the total viscous drag frictional forces dissipated between the surface of rod R and the wall of the cell bore 33.

As hereinbefore described, the total viscous drag frictional forces available from the fluid F in any specific flow reversal cell 20, 22, 24, 26 (i.e., the total force required to pump fluid F through the said reversal cell 20, 22, 24, 26) are ordinarily developed or dissipated between the surface of rod R and the wall of the cell bore 33 generally proportionately to their respective areas. The means shown in FIGS. 10 and 11 permit this generally proportional distribution of viscous drag frictional forces to be varied as required, so as to apply a greater proportion, and hence amount, of such viscous drag frictional forces to the rod R when $S_A$ falls below $S_R$ by such an amount that $S_R - S_A$ approaches the $S_Y$ for rod R (as a practical matter, the proportion of the total viscous drag frictional forces applied to rod R will be increased when $S_R - S_A$ exceeds ½ $S_Y$), and so as to apply a lesser proportion, and hence amount, of such viscous drag frictional forces to the rod R when $S_A$ rises above $S_R$ by such an amount that $S_A - S_R$ approaches the $S_Y$ for rod R (as a practical matter, the proportion of the total viscous drag frictional forces applied to rod R will be decreased when $S_A - S_R$ exceeds ½ $S_Y$).

More specifically, the amount of viscous drag frictional forces applied to a surface by a pressurized viscous fluid flowing along the surface is a function of the viscosity of the fluid. Viscosity is a function of temperature, and therefore the viscosity of the layer of viscous fluid flowing along a surface, and the viscous drag frictional forces applied to the surface by the flowing viscous fluid can be varied by varying the temperature of the surface. By suitable choice of flow conditions, such adjustment of fluid viscosity can be confined substantially to the layer of fluid immediately adjacent the said surfaces. It will, therefore, be seen that for a given total amount of viscous drag frictional forces available from a viscous fluid flowing between two surfaces, various and selected proportions thereof can be transferred from one surface to the other surface by adjusting the temperature of one surface to change the viscosity of the layer of flowing viscous fluid adjacent the said one surface.

Referring now to the particular disclosure of FIGS. 10 and 11, it will be seen that each cell insert 30 of viscous drag rod feeder 10 of FIG. 3 has mounted in its respective central bore 33 a cylindrical liner 70 extending substantially the entire length thereof and adapted to function as an electrically powered heating element. Liner 70 is constructed of a material whose temperature can be controllably elevated by varying the amount of electrical current flowing therethrough. Specifically, liner 70 may be metallic in nature. The alloy known as Nichrome has current temperature characteristics which are eminently suited for this purpose, and consequently liner 70 is preferably made of this material. A cylindrical sleeve 71 of electrically insulating material is interposed between cell insert 30 and liner 70, and may have an inturned flange 72 at either end thereof whereby liner 70 is electrically isolated from cell insert 30 except as hereinafter provided.

Transducer 73, operatively associated with extrusion die 12, senses the force required to extrude rod R through the said extrusion die 12, which force is a function of $S_A$ in rod R, and transmits through line 74 a signal responsive to said force to one input of amplifier 75 hereinafter to be described. Transducer 73 is shown only diagrammatically, and may have a central aperture 76 aligned with the orifice 11 of extrusion die 12 and thus be adapted to surround extruded wire 14. Transducer 73 is shown abutting extrusion die 12 and may be mechanically connected thereto in a manner known to those familiar with the art. Such details have been omitted as not being necessary to a full and complete understanding of the present invention and would, if illustrated, merely obfuscate the drawing.

Means are provided to sense the pressure of fluid F in cell 20 adjacent the face of extrusion die 12 and to transmit a signal in response to said fluid pressure to another input of amplifier 75. Such means, as shown diagrammatically in FIG. 10, may comprise a transducer 77 mounted in the wall of housing 16 and connected through line 78 to the said other input of amplifier 75.

Amplifier 75 produces an output responsive to the difference between the signals fed to the two inputs through lines 74 and 78, and the output of amplifier 75 is thus responsive to $S_A - S_R$ or $S_R - S_A$. Amplifier 75 is powered through lines 79 and 80, and the output of amplifier 75 appears across lines 81 and 82.

Liners 70 are electrically connected in series to the output of amplifier 75 in any suitable manner. As shown diagrammatically in FIG. 10, such series connection may be made by means of line 81 extending between amplifier 75 and one end of that liner 70 in the fourth or last flow reversal cell 26, line 83 extending between adjacent ends of liner 70 in flow reversal cells 24, 22 and 20, and line 82 extending between amplifier 75 and a suitable ground, it being seen that that end of liner 70 in the first flow reversal cell 20 adjacent port 62 is suitably grounded, for instance, by direct contact between the end of this last-mentioned liner 70 and cell insert 30, the inturned flange 72 on the adjacent end of sleeve 71 being removed for this purpose. It will be understood that, where any lines (such as line 81 and 83) pass through housing 16, barrier plates 36 and cell insert 30, suitable electrically insulating pressure resistant sleeves (not shown) may be provided to protect these lines and to prevent the escape of fluid F.

In the preferred manner of operation, sufficient current is passed through liners 70 to maintain a median temperature therein corresponding to a desired relationship between $S_A$ and $S_R$ in cell 20. For instance, it may be desired, as a practical matter, to maintain the difference between $S_A$ and $S_R$ at no more than ½ $S_Y$. Excursions in the difference between $S_A$ and $S_R$ above the said desired difference are sensed by amplifier 75 through transducers 73 and 77, and appropriate transitory and compensatory excursions of the temperature of liner 70 form their median temperature are produced by controlled variation of the current flowing therethrough.

Specifically, when amplifier 75 senses, through transducers 73 and 77, that $S_R - S_A$ is increasing above the desired limit, the output of amplifier 75 will increase so as to increase the current flow through liners 70, thereby to elevate the temperatures of liners 70 above the median temperature. This will increase the temperature of fluid F adjacent the walls of cell bores 33, and cause a greater proportion of the total viscous drag frictional forces to be applied to rod R, whereupon $S_A$ will increase and $S_R - S_A$ will be appropriately decreased below the desired limit.

Conversely, when amplifier 75 senses, through transducers 73 and 77, that $S_A - S_R$ is increasing above the desired limit, the output of amplifier 75 will decrease so as to decrease the current flow through liners 70, thereby to lower the temperature of liner 70 below the median temperature. This will decrease the temperature of fluid F adjacent the walls of cell bores 33 and cause a lesser proportion of the total viscous drag frictional force to be applied to rod R, whereupon $S_A$ will decrease and $S_A - S_R$ will be appropriately decreased below the desired limit.

It should be clearly understood that the disclosure of FIGS. 10 and 11, described as applicable to viscous drag rod feeder 10 of FIG. 3 applies also to input viscous drag feeder 110 of FIG. 8, in which instance transducer 73 would be physically associated with extrusion die 202. Moreover, under some conditions, it may be desired to control the difference between $S_R$ and $S_A$ in wire W past the extrusion die 202 by control of the viscosity of the viscous fluid in output viscous drag feeders 210 or 310 of FIG. 8, in the manner heretofore described. Thus, feeders 210 or 310 would be constructed according to the disclosure of FIGS. 10 and 11, transducer 73 being physically associated with extrusion die 202 and transducer 79 being mounted in that cell adjacent extrusion die 202.

What is claimed is:

1. Method for deforming an elongated workpiece of indefinite length, said method comprising:
    a. applying a flow of fluid along the elongated surface of the elongated workpiece to produce viscous drag force thereon and advance the elongated workpiece,
    b. advancing the elongated workpiece against a deforming agency to produce an elongated product of indefinite length and having a cross-section different from that of the elongated workpiece,
    c. adjusting viscosity in the fluid to control the magnitude of said viscous drag force on said elongated workpiece.
2. Method as in claim 1, comprising:
    d. performing step (c) by adjusting temperature in the fluid.
3. Method as in claim 1, comprising:
    d. performing steps (a), (b), and (c) on metal rod to extrude said rod through an extrusion die to produce wire.
4. Apparatus for deforming an elongated member of indefinite length, said apparatus comprising:
    a. elongated conduit means having a first end and a second end, said elongated conduit means being adapted to receive said elongated member through said first end with an annular space between said elongated conduit means and said elongated member;
    b. deforming means positioned adjacent the second end of said elongated conduit means;
    c. fluid outlet means positioned adjacent the second end of said elongated conduit means;
    d. pump means adapted to pump viscous fluid through said annular space from the first end of said elongated conduit means to said fluid outlet means adjacent the second end of said elongated conduit means thereby to exert viscous drag force along the elongated surface of said elongated member directed toward said deforming means to advance said elongated member through said elongated conduit means and against said deforming means;
    e. control means adapted to adjust viscosity in said viscous fluid thereby to control the magnitude of said viscous drag force.
5. Apparatus as in claim 4, wherein:
    f. said control means is adapted to adjust temperature in said viscous fluid.
6. Apparatus as in claim 4, said viscous fluid exerting axial stress in and normal pressure on said elongated member, said apparatus comprising:
    f. means associated with said elongated conduit means and adapted to detect the magnitude of the difference between said axial stress and said normal pressure and to produce a signal in response to the magnitude of said difference;
    g. said control means being responsive to said signal to maintain said difference below a predetermined value.
7. Apparatus as in claim 6:
    h. said control means comprising electrically operated heating means operatively associated with said elongated conduit means and adapted to change temperature in said viscous fluid.
8. Apparatus as in claim 6:

h. said predetermined value being the yield strength of said elongated member.

9. Apparatus as in claim 6:

h. said predetermined value being one-half the yield strength of said elongated member.

10. Apparatus as in claim 4, comprising:

f. a pressure chamber interposed between the second end of said elongated conduit means and said deforming means and adapted to receive said elongated member.

* * * * *